(12) United States Patent
Wang et al.

(10) Patent No.: US 12,010,456 B2
(45) Date of Patent: Jun. 11, 2024

(54) METHOD FOR PERFORMING FRAME INTERPOLATION BASED ON SINGLE-DIRECTIONAL MOTION AND ASSOCIATED NON-TRANSITORY MACHINE-READABLE MEDIUM

(71) Applicant: MEDIATEK INC., Hsin-Chu (TW)

(72) Inventors: Yao-Sheng Wang, Hsinchu (TW);
Pei-Kuei Tsung, Hsinchu (TW);
Chia-Ni Lu, Hsinchu (TW); Yu-Sheng Lin, Hsinchu (TW); Chien-Yu Huang, Hsinchu (TW); Chih-Wen Goo, Hsinchu (TW); Cheng-Lung Jen, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 18/128,180

(22) Filed: Mar. 29, 2023

(65) Prior Publication Data
US 2023/0328202 A1   Oct. 12, 2023

Related U.S. Application Data

(60) Provisional application No. 63/327,898, filed on Apr. 6, 2022.

(51) Int. Cl.
*H04N 7/01*   (2006.01)

(52) U.S. Cl.
CPC ........... *H04N 7/014* (2013.01); *H04N 7/0127* (2013.01)

(58) Field of Classification Search
CPC .... H04N 7/0127; H04N 7/014; H04N 7/0135; H04N 7/0145; H04N 7/0147; H04N 7/0137; H04N 7/0117; H04N 7/01

USPC ....... 348/441, 448, 451, 452, 458, 459, 699, 348/701
See application file for complete search history.

(56) References Cited

U.S. PATENT DOCUMENTS

2010/0079667 A1*   4/2010   Turetken .............. H04N 7/014
348/E7.003

FOREIGN PATENT DOCUMENTS

| CN | 103702128 A | 4/2014 |
|---|---|---|
| CN | 104011771 A | 8/2014 |
| CN | 103150743 B | 4/2016 |
| CN | 103702128 B | 11/2016 |
| CN | 106210767 A | 12/2016 |
| CN | 111586409 A | 8/2020 |

(Continued)

*Primary Examiner* — Sherrie Hsia
(74) *Attorney, Agent, or Firm* — Winston Hsu

(57) ABSTRACT

A frame interpolation method for generating a third image frame interpolated between a first image frame and a second image frame includes: performing motion estimation upon a first input image frame and a second input image frame, to obtain a single-directional motion, wherein the first input image frame is derived from the first image frame, and the second input image frame is derived from the second image frame; scaling the single-directional motion according to a time point of the third image frame, to generate a scaled motion; deriving a forward-warped result from a result of performing a forward warping operation and a first inverse operation upon the scaled motion; performing a second inverse operation upon the forward-warped result, to generate an inversed result; and generating the third image frame according to the first image frame, the second image frame, the forward-warped result, and the inversed result.

20 Claims, 6 Drawing Sheets

(56) References Cited

FOREIGN PATENT DOCUMENTS

| CN | 108886584 B | 11/2020 |
|---|---|---|
| TW | 1535296 B | 5/2016 |
| WO | 2019/084804 A1 | 5/2019 |

\* cited by examiner

METHOD FOR PERFORMING FRAME INTERPOLATION BASED ON SINGLE-DIRECTIONAL MOTION AND ASSOCIATED NON-TRANSITORY MACHINE-READABLE MEDIUM

CROSS REFERENCE TO RELATED APPLICATIONS

This application claims the benefit of U.S. Provisional Application No. 63/327,898, filed on Apr. 6, 2022. The content of the application is incorporated herein by reference.

BACKGROUND

The present invention is related to frame interpolation, and more particularly, to a method for performing frame interpolation based on a single-directional motion and an associated non-transitory machine-readable medium.

With advancement of technology, requirements for frames per second (FPS) of an image frame sequence are getting higher and higher. For example, when a user is watching a video corresponding to an image frame sequence, if the FPS of the frame sequence is too low, the video displayed on a screen may shake or become blurred. As a result, a frame interpolation technology is utilized to make the video smoother and therefore improve user's viewing experience. For a case where the frame interpolation is performed between an image frame $I_0$ and an image frame $I_1$ that is different from the image frame $I_0$ in an image frame sequence, a conventional frame interpolation method must obtain a bi-directional motion (i.e. both of a motion from the image frame $I_0$ to the image frame $I_1$ and another motion from the image frame $I_1$ to the image frame $I_0$) to perform a backward warping operation upon the image frame $I_0$ and the image frame $I_1$, respectively, for generating multiple backward-warped results. Afterwards, the multiple backward-warped results are blended into a target interpolated frame for the frame interpolation performed between the image frame $I_0$ and the image frame $I_1$. However, when only a single-directional motion (e.g. only one of the motion from the image frame $I_0$ to the image frame $I_1$ and the motion from the image frame $I_1$ to the image frame $I_0$) can be obtained due to some reasons (e.g. tradeoff between cost, computation, and/or power saving), some problems may occur (e.g. the frame interpolation operation cannot be successfully performed). As a result, a novel method for performing frame interpolation based on a single-directional motion is urgently needed.

SUMMARY

It is therefore one of the objectives of the present invention to provide a method for performing frame interpolation based on a single-directional motion and an associated non-transitory machine-readable medium, to address the above-mentioned issues.

According to an embodiment of the present invention, a frame interpolation method for generating a third image frame interpolated between a first image frame and a second image frame is provided. The frame interpolation method comprises: performing motion estimation upon a first input image frame and a second input image frame, to obtain a single-directional motion, wherein the first input image frame is derived from the first image frame, and the second input image frame is derived from the second image frame; scaling the single-directional motion according to a time point of the third image frame, to generate a scaled motion; deriving a forward-warped result from a result of performing a forward warping operation and a first inverse operation upon the scaled motion; performing a second inverse operation upon the forward-warped result, to generate an inversed result; and generating the third image frame according to the first image frame, the second image frame, the forward-warped result, and the inversed result.

According to an embodiment of the present invention, a non-transitory machine-readable medium for storing a program code is provided. When loaded and executed by a processor, the program code instructs the processor to execute a frame interpolation module. The frame interpolation module is arranged to generate a third image frame interpolated between a first image frame and a second image frame, and includes a motion estimating module, a scaling module, a first processing module, an inverse module, and a second processing module. The motion estimation module is arranged to perform motion estimation upon a first input image frame and a second input image frame, to obtain a single-directional motion, wherein the first input image frame is derived from the first image frame, and the second input image frame is derived from the second image frame. The scaling module is arranged to scale the single-directional motion according to a time point of the third image frame, to generate a scaled motion. The first processing module is arranged to derive a forward-warped result from a result of performing a forward warping operation and a first inverse operation upon the scaled motion. The inverse module is arranged to perform a second inverse operation upon the forward-warped result, to generate an inversed result. The second processing module is arranged to generate the third image frame according to the first image frame, the second image frame, the forward-warped result, and the inversed result.

One of the benefits of the present invention is that, by the frame interpolation method of the present invention, under a condition that only a single-directional motion can be obtained due to some reasons (e.g. tradeoff between cost, computation, and/or power saving), frame interpolation can be performed successfully.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ".

Figure 1:
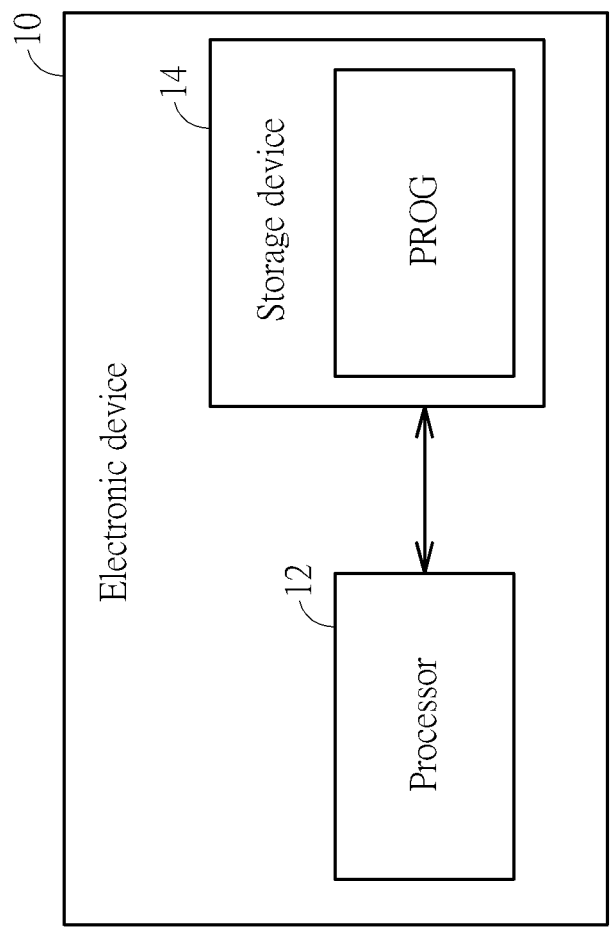
FIG. 1 is a diagram illustrating an electronic device according to an embodiment of the present invention.

FIG. 1 is a diagram illustrating an electronic device 10 according to an embodiment of the present invention. Byway of example, but not limitation, the electronic device 10 may be a portable device such as a smartphone, a wearable device, or a tablet. The electronic device 10 may include a processor 12 and a storage device 14. The processor 12 may be a single-core processor or a multi-core processor. The storage device 14 is a non-transitory machine-readable medium, and is arranged to store computer program code PROG. The processor 12 is equipped with software execution capability. The computer program code PROG may include multiple algorithms (e.g. a computer vision algorithm and an artificial intelligence (AI) algorithm). When loaded and executed by the processor 12, the computer program code PROG instructs the processor 12 to perform a frame interpolation method as proposed by the present invention. The electronic device 10 may be regarded as a computer system using a computer program product that includes a computer-readable medium containing the computer program code PROG. That is, the frame interpolation method of the present invention may be embodied on the electronic device 10.

Figure 2:
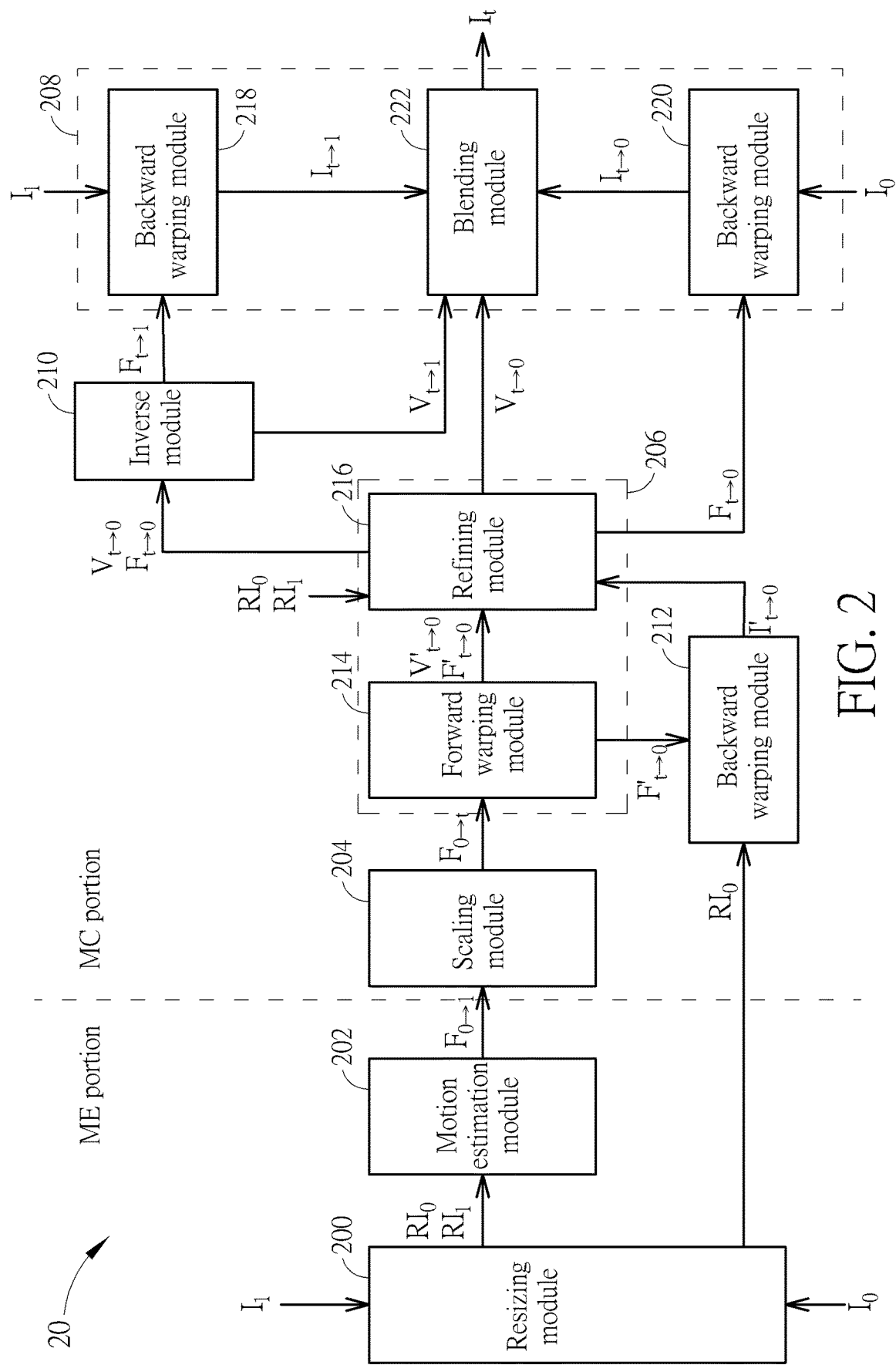
FIG. 2 is a diagram illustrating a control scheme of a frame interpolation module according to an embodiment of the present invention.

FIG. 2 is a diagram illustrating a control scheme of a frame interpolation module 20 according to an embodiment of the present invention. The frame interpolation module 20 may include circuits arranged to perform the frame interpolation method of the present invention. For example, the frame interpolation module 20 may be implemented by the processor 12 running the computer program code PROG. Alternatively, the frame interpolation module 20 may be implemented by dedicated hardware. As shown in FIG. 2, the frame interpolation module 20 may include a motion estimation portion and a motion compensation portion (for brevity, labeled as "ME portion" and "MC portion" in FIG. 2, respectively), wherein the motion estimation portion may include a resizing module 200 and a motion estimation module 202, and the motion compensation portion may include a scaling module 204, multiple processing modules 206 and 208, an inverse module 210, and a backward warping module 212. It should be noted that both of the resizing module 200 and the backward warping module 212 may be optional, depending upon actual design considerations.

It is assumed that an image frame sequence $\{I_0, I_1, I_2, \ldots, I_n\}$ including image frames $I_0$-$I_n$ with a low frames per second (FPS) is input into the frame interpolation module 20, wherein "n" is a positive integer greater than 1 (i.e. n>1). The frame interpolation module 20 is arranged to perform the frame interpolation upon the image frame sequence $\{I_0, I_1, I_2, \ldots, I_n\}$ to increase its FPS. In this embodiment, for better comprehension, a target image frame $I_t$ that is interpolated between the image frames $I_0$ and $I_1$ in the image frame sequence $\{I_0, I_1, I_2, \ldots, I_n\}$ by the frame interpolation method of the present invention is taken as an example.

In the motion estimation portion, the resizing module 200 may be arranged to resize the image frames $I_0$ and $I_1$, respectively, to generate resized image frames $RI_0$ and $RI_1$, for tradeoff between interpolation quality and any of cost, computation, and/or power. The motion estimation module 202 may be arranged to perform motion estimation upon a first input image frame F_IIF and a second input image frame S_IIF, to obtain a single-directional motion $F_{0 \to 1}$, wherein the first input image frame F_IIF is derived from the image frame $I_0$, and the second input image frame S_IIF is derived from the second image frame $I_1$, and the single-directional motion $F_{0 \to 1}$ indicates a motion from the image frame $I_0$ to the image frame $I_1$. In this embodiment, the resized image frames $RI_0$ and $RI_1$ act as the first input image frame F_IIF and the second input image frame S_IIF, respectively, but the present invention is not limited thereto. In some embodiments, at the expense of the interpolation quality, the image frames $I_0$ and $I_1$ may directly act as the first input image frame F_IIF and the second input image frame S_IIF, respectively.

In the motion compensation portion, the scaling module 204 may be arranged to scale the single-directional motion $F_{0 \to 1}$ according to a time point of the target image frame $I_t$ to generate a scaled motion $F_{0 \to t}$. For example, under a condition that a relationship between a position of the target image frame $I_t$ and the single-directional motion $F_{0 \to 1}$ is linear, if time points of the image frame $I_0$, the target image frame $I_t$, and the image frame $I_1$ are 0, t, and 1, respectively, the scaling module 204 may scale down the single-directional motion $F_{0 \to 1}$ by t to generate the scaled motion $F_{0-t}$, wherein "t" is a positive number between 0 and 1, and is a time point at which the target image frame $I_1$ is interpolated between the image frames $I_0$ and $I_1$.

The processing module 206 may be arranged to derive a forward-warped result FWR from a result of performing a forward warping operation and an inverse operation upon the scaled motion $F_{0 \to t}$. In detail, the processing module 206 may include a forward warping module 214 and a refining module 216. The forward warping module 214 may be arranged to perform a forward warping operation and an inverse operation upon the scaled motion $F_{0 \to t}$, to generate a coarse forward-warped result CFWR, wherein the coarse forward-warped result CFWR includes an alpha map $V'_{t \to 0}$ and a forward-warped motion $F'_{t \to 0}$, and the alpha map $V'_{t \to 0}$ may indicate holes caused by performing the forward warping operation.

The refining module 216 may be arranged to refine the coarse forward-warped result CFWR according to at least the first input image frame F_IIF and the second input image frame S_IIF (e.g. the resized image frames $RI_0$ and $RI_1$), to generate the forward-warped result FWR, wherein the forward-warped result FWR includes a refined alpha map $V_{t \to 0}$ and a refined motion $F_{t \to 0}$. Specifically, the refining module 216 may execute a computer vision algorithm and/or an artificial intelligence (AI) algorithm to refine the alpha map $V'_{t \to 0}$ and the forward-warped motion $F'_{t \to 0}$ according to at least the first input image frame F_IIF and the second input image frame S_IIF (e.g. the resized image frames $RI_0$ and $RI_1$), respectively, to generate the refined alpha map $V_{t \to 0}$ and the refined motion $F_{t \to 0}$. For example, the above-mentioned holes caused by performing the forward warping operation can be inpainted by the refining module 216.

In this embodiment, in order to enhance the interpolation quality, the backward warping module 212 may be arranged to perform a backward warping operation upon the first input image frame F_IIF (e.g. the resized image frame $RI_0$) according to the forward-warped motion $F'_{t \to 0}$ from the forward warping module 214, to generate a backward-warped result $I'_{t \to 0}$. The refining module 216 may refine the alpha map $V'_{t \to 0}$ and the forward-warped motion $F'_{t \to 0}$ according to the first input image frame F_IIF (e.g. the resized image frame $RI_0$), the second input image frame S_IIF (e.g. the resized image frame $RI_1$), and the backward-warped result $I'_{t \to 0}$, respectively, to generate the refined alpha map $V_{t \to 0}$ and the refined motion $F_{t \to 0}$.

The inverse module 210 may be arranged to perform an inverse operation upon the forward-warped result FWR, to generate an inversed result IR, wherein the inversed result IR includes an inversed alpha map $V_{t \to 1}$ and an inversed motion $F_{t \to 1}$. Specifically, the inverse module 210 may perform the inverse operation upon the refined alpha map $V_{t \to 0}$ and the refined motion $F_{t \to 0}$, respectively, to generate the inversed alpha map $V_{t \to 1}$ and the inversed motion $F_{t \to 1}$.

The processing module 208 may be arranged to generate the target image frame $I_t$ according to the image frames $I_0$ and $I_1$, the forward-warped result FWR, and the inversed result IR. In detail, the processing module 208 may include multiple backward warping modules 218 and 220 and a blending module 222. The backward warping module 218 may be arranged to perform a backward warping operation upon the image frame $I_1$ according to the inversed motion $F_{t \to 1}$, to generate a backward-warped result $I_{t \to 1}$. The backward warping module 220 may be arranged to perform a backward warping operation upon the image frame $I_0$ according to the refined motion $F_{t \to 0}$, to generate a backward-warped result $I_{t \to 0}$. Afterwards, the blending module 222 may be arranged to blend the backward-warped results $I_{t \to 1}$ and $I_{t \to 0}$ according to the refined alpha map $V_{t \to 0}$ and the inversed alpha map $V_{t \to 1}$, to generate the target image frame $I_1$ for performing the frame interpolation between the image frames $I_0$ and $I_1$. Specifically, the blending module 222 may be arranged to multiply the backward-warped result $I_{t \to 0}$ and the refined alpha map $V_{t \to 0}$ to generate a first multiplication result FMR (e.g. FMR=$I_{t \to 0}*V_{t \to 0}$) multiply the backward-warped result $I_{t \to 1}$ and the inversed alpha map $V_{t \to 1}$ to generate a second multiplication result SMR (e.g. SMR=$I_{t \to 1}*V_{t \to 1}$) and add the first multiplication result FMR and the second multiplication result SMR to generate the target image frame $I_1$ (e.g. $I_t$=FMR+SMR=$I_{t \to 0}*V_{t \to 0}+I_{t \to 1}*V_{t \to 1}$).

Figure 3:
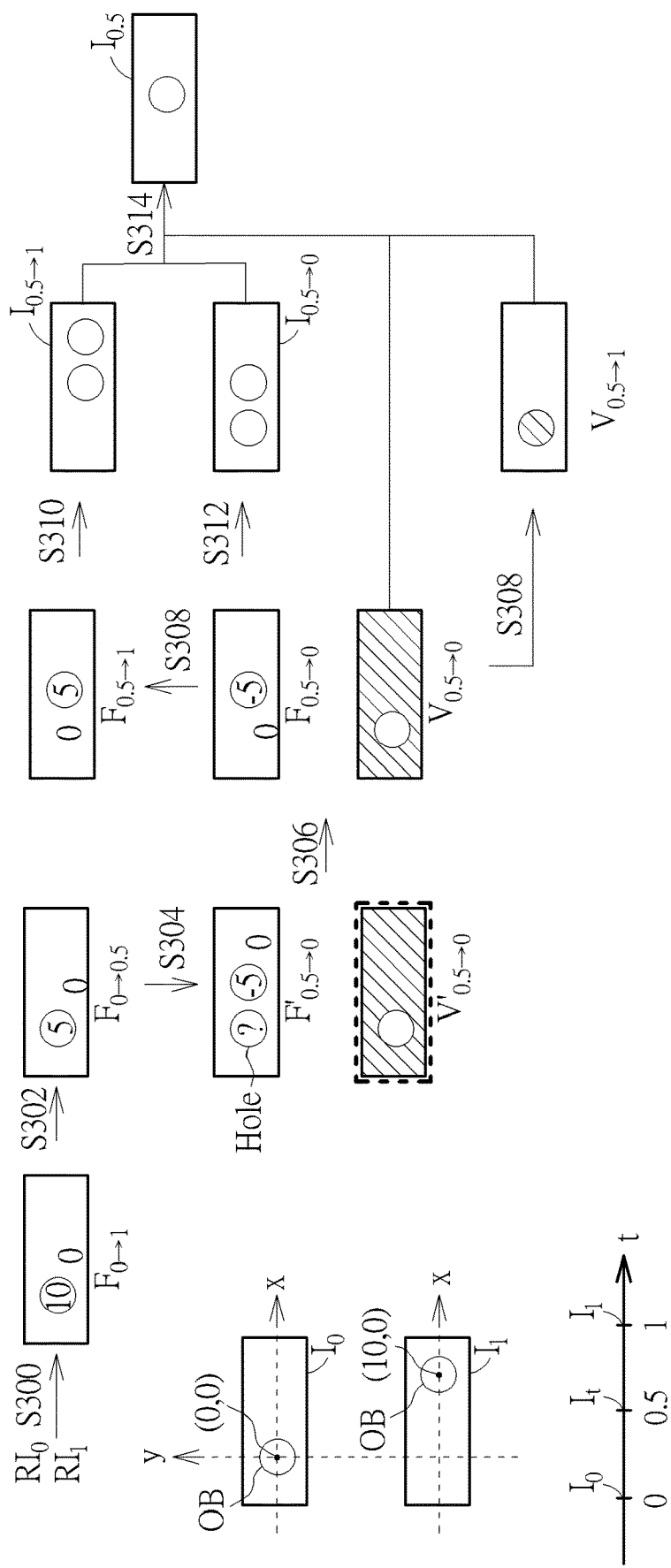
FIG. 3 is an example of the control scheme of the frame interpolation module shown in FIG. 2 according to an embodiment of the present invention.

FIG. 3 is an example of the control scheme of the frame interpolation module 20 shown in FIG. 2 according to an embodiment of the present invention. In this embodiment, it is assumed that the time points of the image frame $I_0$, the target image frame $I_t$, and the image frame $I_1$ are 0, 0.5, and 1, respectively (i.e. $I_t$=$I_{0.5}$). In addition, a horizontal position coordinate x and a vertical position coordinate y of a center of an object OB in the image frame $I_0$ is (0, 0), and the horizontal position coordinate x and the vertical position coordinate y of the center of the object OB in the image frame $I_1$ is (10, 0). That is, the displacement from the pixels of the image frame $I_0$ (more particularly, the pixels of the object OB in the image frame $I_0$) to the pixels of the image frame $I_1$ (more particularly, the pixels of the object OB in the image frame $I_1$) in the horizontal direction is 10, and the displacement from the pixels of the image frame $I_0$ (more particularly, the pixels of the object OB in the image frame $I_0$) to the pixels of the image frame $I_1$ (more particularly, the pixels of the object OB in the image frame $I_1$) in the vertical direction is 0. However, this is for illustration only, and the present invention is not limited thereto. In some embodiment, the object OB can move vertically and/or both horizontally and vertically.

In Step S300, the single-directional motion $F_{0 \to 1}$ is obtained by performing motion estimation upon the resized image frames $RI_0$ and $RI_1$ (or the image frames $I_0$ and $I_1$) through the motion estimation module 202, wherein the single-directional motion $F_{0 \to 1}$ indicates the displacement from the pixels of the image frame $I_0$ to the pixels of the image frame $I_1$, such as 10 in the horizontal direction.

In Step S302, the single-directional motion $F_{0 \to 1}$ is scaled by the scaling module 204 according to the time point of the target image frame $I_{0.5}$ to generate the scaled motion $F_{0 \to 0.5}$. For example, under a condition that a relationship between the position of the target image frame $I_{0.5}$ and the single-directional motion $F_{0 \to 1}$ is linear, since the time points of the image frame $I_0$, the target image frame $I_{0.5}$, and the image frame $I_1$ are 0, 0.5, and 1, respectively, the scaling module 204 may scale down the single-directional motion $F_{0 \to 1}$ by 2 to generate the scaled motion $F_{0 \to 0.5}$. In detail, the scaling module 204 may scale down the horizontal position coordinate x and the vertical position coordinate y corresponding to the single-directional motion $F_{0 \to 1}$ (denoted by F(x, y)) by 2, respectively, to generate the scaled motion $F_{0 \to 0.5}$. That is, the horizontal position coordinate x and the vertical position coordinate y corresponding to the scaled motion $F_{0 \to 0.5}$ is F(0.5*x, 0.5*y).

In Step S304, a forward warping operation and an inverse operation are performed upon the scaled motion $F_{0 \to 0.5}$ by the forward warping module 214, to generate the coarse forward-warped result CFWR, wherein the coarse forward-warped result CFWR includes the alpha map $V'_{0.5 \to 0}$ and the forward-warped motion $F'_{0.5 \to 0}$, and the alpha map $V'_{0.5 \to 0}$ can indicate holes caused by performing the forward warping operation.

In Step S306, the alpha map $V'_{0.5 \to 0}$ and the forward-warped motion $F'_{0.5 \to 0}$ are refined by the refining module 216, respectively, to generate the refined alpha map $V_{0.5 \to 0}$ and the refined motion $F_{0.5 \to 0}$. In addition, the holes caused by performing the forward warping operation can be inpainted by the refining module 216.

In Step S308, an inverse operation is performed upon the refined alpha map $V_{0.5 \to 0}$ and the refined motion $F_{0.5 \to 0}$ by the inverse module 210, respectively, to generate the inversed alpha map $V_{0.5 \to 1}$ and the inversed motion $F_{0.5 \to 1}$.

In Step S310, a backward warping operation is performed upon the image frame $I_1$ by the backward warping module 218 according to the inversed motion $F_{0.5 \to 1}$, to generate a backward-warped result $I_{0.5 \to 1}$.

In Step S312, a backward warping operation is performed upon the image frame $I_0$ by the backward warping module 220 according to the refined motion $F_{0.5 \to 0}$, to generate a backward-warped result $I_{0.5 \to 0}$.

In Step S314, the backward-warped results $I_{0.5 \to 1}$ and $I_{0.5 \to 0}$ are blended by the blending module 222 according to the refined alpha map $V_{0.5 \to 0}$ and the inversed alpha map $V_{0.5 \to 1}$, to generate the target image frame $I_{0.5}$ for performing the frame interpolation between the image frames $I_0$ and $I_1$. Specifically, the backward-warped result $I_{0.5 \to 0}$ and the refined alpha map $V_{0.5 \to 0}$ are multiplied to generate the first multiplication result FMR (e.g. FMR=$I_{0.5 \to 0}*V_{0.5 \to 0}$). The backward-warped result $I_{0.5 \to 1}$ and the inversed alpha map $V_{0.5 \to 1}$ are multiplied to generate the second multiplication result SMR (e.g. SMR=$I_{0.5 \to 1}*V_{0.5 \to 1}$). The first multiplication result FMR and the second multiplication result SMR are added to generate the target image frame $I_{0.5}$ (e.g. $I_{0.5}$=FMR+SMR=$I_{0.5 \to 0}*V_{0.5 \to 0}+I_{0.5 \to 1}*V_{0.5 \to 1}$).

Figure 4:
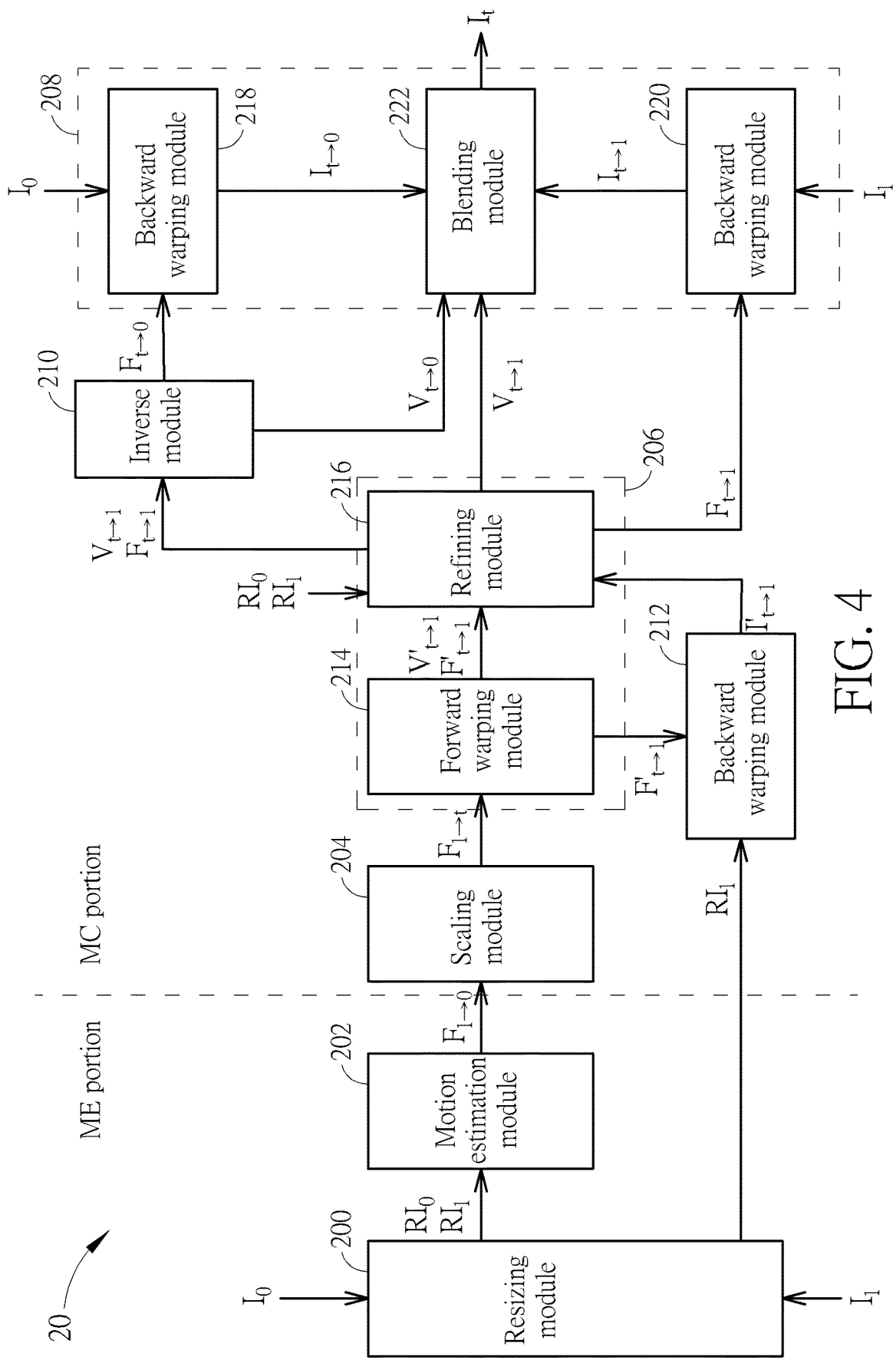
FIG. 4 is a diagram illustrating a control scheme of a frame interpolation module according to another embodiment of the present invention.

FIG. 4 is a diagram illustrating a control scheme of the frame interpolation module 20 according to another embodiment of the present invention. The difference between the control scheme shown in FIG. 2 and the control scheme shown in FIG. 4 is that the motion estimation module 202 shown in FIG. 4 may be arranged to perform motion estimation upon the first input image frame F_IIF and a second input image frame S_IIF, to obtain a single-directional motion $F_{1 \to 0}$, wherein the single-directional motion $F_{1 \to 0}$ indicates a motion from the image frame $I_1$ to the image frame $I_0$ (i.e. the single-directional motion $F_{1 \to 0}$ and the single-directional motion $F_{0 \to 1}$ obtained by the estimation module 202 shown in FIG. 2 are in opposite directions).

After the single-directional motion $F_{1 \to 0}$ is obtained by the estimation module 202, the scaling module 204 may be arranged to scale the single-directional motion $F_{1 \to 0}$ according to a time point of the target image frame $I_1$ to generate a scaled motion $F_{1 \to t}$. For example, under a condition that a relationship between a position of the target image frame $I_1$ and the single-directional motion $F_{1 \to 0}$ is linear, if time points of the image frame $I_0$, the target image frame $I_t$, and the image frame $I_1$ are 0, t, and 1, respectively, the scaling module 204 may scale down the single-directional motion $F_{1 \to 0}$ by t to generate the scaled motion $F_{1 \to t}$, wherein "t" is a positive number between 0 and 1, and is a time point at which the target image frame $I_t$ is interpolated between the image frames $I_0$ and $I_1$.

The forward warping module 214 may be arranged to perform a forward warping operation and an inverse operation upon the scaled motion $F_{1 \to t}$, to generate a coarse forward-warped result CFWR', wherein the coarse forward-warped result CFWR' includes an alpha map $V'_{t \to 1}$ and a forward-warped motion $F'_{t \to 1}$, and the alpha map $V'_{t \to 1}$ may indicate holes caused by performing the forward warping operation. The refining module 216 may be arranged to refine the coarse forward-warped result CFWR' according to at least the resized image frames $RI_0$ and $RI_1$, to generate a forward-warped result FWR', wherein the forward-warped result FWR' includes a refined alpha map $V_{t \to 1}$ and a refined motion $F_{t \to 1}$. Specifically, the refining module 216 may execute a computer vision algorithm and/or an AI algorithm to refine the alpha map $V'_{t \to 1}$ and the forward-warped motion $F'_{t \to 1}$ according to at least the resized image frames $RI_0$ and $RI_1$, respectively, to generate the refined alpha map $V_{t \to 1}$ and the refined motion $F_{t \to 1}$. For example, the above-mentioned holes caused by performing the forward warping operation can be inpainted by the refining module 216.

In this embodiment, in order to enhance the interpolation quality, the optional backward warping module 212 may be arranged to perform a backward warping operation upon the resized image frame $RI_1$ according to the forward-warped motion $F'_{t \to 1}$ from the forward warping module 214, to generate a backward-warped result $I'_{t \to 1}$. The refining module 216 may refine the alpha map $V'_{t \to 1}$ and the forward-warped motion $F'_{t \to 1}$ according to the backward-warped result $I'_{t \to 1}$ and the resized image frames Rho and $RI_1$, respectively, to generate the refined alpha map $V_{t \to 1}$ and the refined motion $F_{t \to 1}$.

The inverse module 210 may be arranged to perform an inverse operation upon the forward-warped result FWR', to generate an inversed result IR', wherein the inversed result IR' includes an inversed alpha map $V_{t \to 0}$ and an inversed motion $F_{t \to 0}$. Specifically, the inverse module 210 may perform the inverse operation upon the refined alpha map $V_{t \to 1}$ and the refined motion $F_{t \to 1}$, respectively, to generate the inversed alpha map $V_{t \to 0}$ and the inversed motion $F_{t \to 0}$.

The backward warping module 218 may be arranged to perform a backward warping operation upon the image frame $I_0$ according to the inversed motion $F_{t \to 0}$, to generate a backward-warped result $I_{t \to 0}$. The backward warping module 220 may be arranged to perform a backward warping operation upon the image frame $I_1$ according to the refined motion $F_{t \to 1}$, to generate a backward-warped result $I_{t \to 1}$.

Afterwards, the blending module 222 may be arranged to blend the backward-warped results $I_{t \to 0}$ and $I_{t \to 1}$ according to the refined alpha map $V_{t \to 1}$ and the inversed alpha map $V_{t \to 0}$, to generate the target image frame $I_t$ for performing the frame interpolation between the image frames $I_0$ and $I_1$. Specifically, the blending module 222 may be arranged to multiply the backward-warped result $I_{t \to 0}$ and the inversed alpha map $V_{t \to 0}$ to generate a first multiplication result FMR (e.g. FMR=$I_{t \to 0}*V_{t \to 0}$) multiply the backward-warped result $I_{t \to 1}$ and the refined alpha map $V_{t \to 1}$ to generate a second multiplication result SMR (e.g. SMR=$I_{t \to 1}*V_{t \to 1}$), and add the first multiplication result FMR and the second multiplication result SMR to generate the target image frame $I_t$ (e.g. $I_t$=FMR+SMR=$I_{t \to 0}*V_{t \to 0}+I_{t \to 1}*V_{t \to 1}$).

Figure 5:
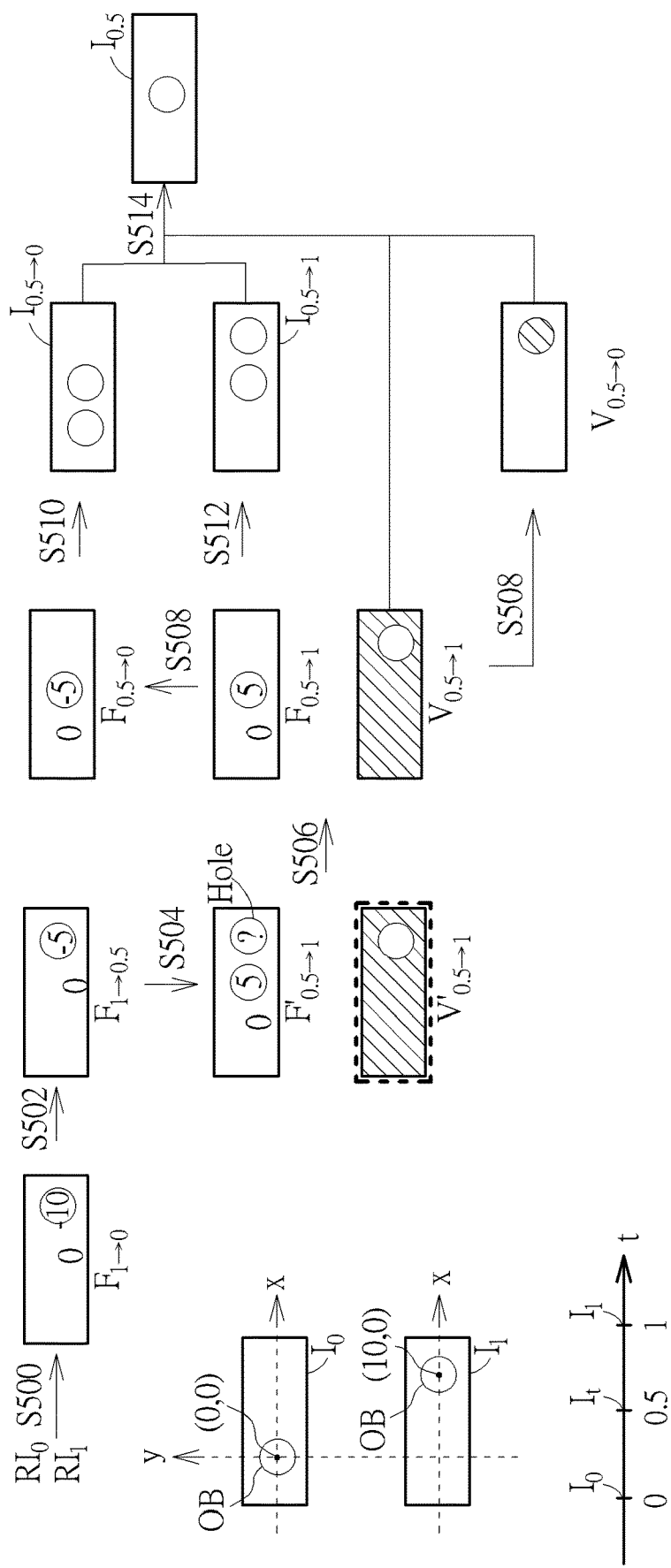
FIG. 5 is an example of the control scheme of the frame interpolation module according to another embodiment of the present invention.

FIG. 5 is an example of the control scheme of the frame interpolation module according to another embodiment of the present invention. In this embodiment, it is assumed that the time points of the image frame $I_0$, the target image frame $I_t$, and the image frame $I_1$ are 0, 0.5, and 1, respectively (i.e. $I_t=I_{0.5}$). In addition, a horizontal position coordinate x and a vertical position coordinate y of a center of an object OB in the image frame $I_0$ is (0, 0), and the position horizontal coordinate x and the vertical position coordinate y of the center of the object OB in the image frame $I_1$ is (10, 0). That is, the displacement from the pixels of the image frame $I_1$ (more particularly, the pixels of the object OB in the image frame $I_1$) to the pixels of the image frame $I_0$ (more particularly, the pixels of the object OB in the image frame $I_0$) in the horizontal direction is −10, and the displacement from the pixels of the image frame $I_1$ (more particularly, the pixels of the object OB in the image frame $I_1$) to the pixels of the image frame $I_0$ (more particularly, the pixels of the object OB in the image frame $I_0$) in the vertical direction is 0. However, this is for illustration only, and the present invention is not limited thereto. In some embodiment, the object OB can move vertically and/or both horizontally and vertically.

In Step S500, the single-directional motion $F_{1 \to 0}$ is obtained by performing motion estimation upon the resized image frames $RI_1$ and $RI_1$ (or the image frames $I_0$ and $I_1$) through the motion estimation module 202, wherein the single-directional motion $F_{1 \to 0}$ indicates the displacement from the pixels of the image frame $I_1$ to the pixels of the image frame $I_0$, such as −10 in the horizontal direction.

In Step S502, the single-directional motion $F_{1 \to 0}$ is scaled by the scaling module 204 according to the time point of the target image frame $I_{0.5}$ to generate the scaled motion $F_{1 \to 0.5}$. For example, under a condition that a relationship between the position of the target image frame $I_{0.5}$ and the single-directional motion $F_{1 \to 0}$ is linear, since the time points of the image frame $I_0$, the target image frame $I_t$, and the image frame $I_1$ are 0, 0.5, and 1, respectively, the scaling module 204 may scale down the single-directional motion $F_{1 \to 0}$ by 2 to generate the scaled motion $F_{1 \to 0.5}$. In detail, the scaling module 204 may scale down the horizontal position coordinate x and the vertical position coordinate y corresponding to the single-directional motion $F_{1 \to 0}$ (denoted by F(x, y)) by 2, respectively, to generate the scaled motion $F_{1 \to 0.5}$. That is, the horizontal position coordinate x and the vertical position coordinate y corresponding to the scaled motion $F_{1 \to 0.5}$ is $F(0.5*x, 0.5*Y)$.

In Step S504, a forward warping operation and an inverse operation are performed upon the scaled motion $F_{1 \to 0.5}$ by the forward warping module 214, to generate the coarse forward-warped result CFWR', wherein the coarse forward-warped result CFWR' includes the alpha map $V'_{0.5 \to 1}$ and the forward-warped motion $F'_{0.5 \to 1}$, and the alpha map $V'_{0.5 \to 1}$ can indicate holes caused by performing the forward warping operation.

In Step S506, the alpha map $V'_{0.5 \to 1}$ and the forward-warped motion $F'_{0.5 \to 1}$ are refined by the refining module 216, respectively, to generate the refined alpha map $V_{0.5 \to 1}$ and the refined motion $F_{0.5 \to 1}$. In addition, the holes caused by performing the forward warping operation can be inpainted by the refining module 216.

In Step S508, an inverse operation is performed upon the refined alpha map $V_{0.5 \to 1}$ and the refined motion $F_{0.5 \to 1}$ by the inverse module 210, respectively, to generate the inversed alpha map $V_{0.5 \to 0}$ and the inversed motion $F_{0.5 \to 0}$.

In Step S510, a backward warping operation is performed upon the image frame $I_0$ by the backward warping module 218 according to the inversed motion $F_{0.5 \to 0}$, to generate a backward-warped result $I_{0.5 \to 0}$.

In Step S512, a backward warping operation is performed upon the image frame $I_1$ by the backward warping module 220 according to the refined motion $F_{0.5 \to 1}$, to generate a backward-warped result $I_{0.5 \to 1}$.

In Step S514, the backward-warped results $I_{0.5 \to 0}$ and $I_{0.5 \to 1}$ are blended by the blending module 222 according to the inversed alpha map $V_{0.5 \to 0}$ and the refined alpha map $V_{0.5 \to 1}$ to generate the target image frame $I_{0.5}$ for performing the frame interpolation between the image frames $I_0$ and $I_1$. Specifically, the backward-warped result $I_{0.5 \to 0}$ and the inversed alpha map $V_{0.5 \to 0}$ are multiplied to generate the first multiplication result FMR (e.g. $FMR = I_{0.5 \to 0} * V_{0.5 \to 0}$). The backward-warped result $I_{0.5 \to 1}$ and the refined alpha map $V_{0.5 \to 1}$ are multiplied to generate the second multiplication result SMR (e.g. $SMR = I_{0.5 \to 1} * V_{0.5 \to 1}$). The first multiplication result FMR and the second multiplication result SMR are added to generate the target image frame $I_{0.5}$ (e.g. $I_{0.5} = FMR + SMR = I_{0.5 \to 0} * V_{0.5 \to 0} + I_{0.5 \to 1} * V_{0.5 \to 1}$).

Figure 6:
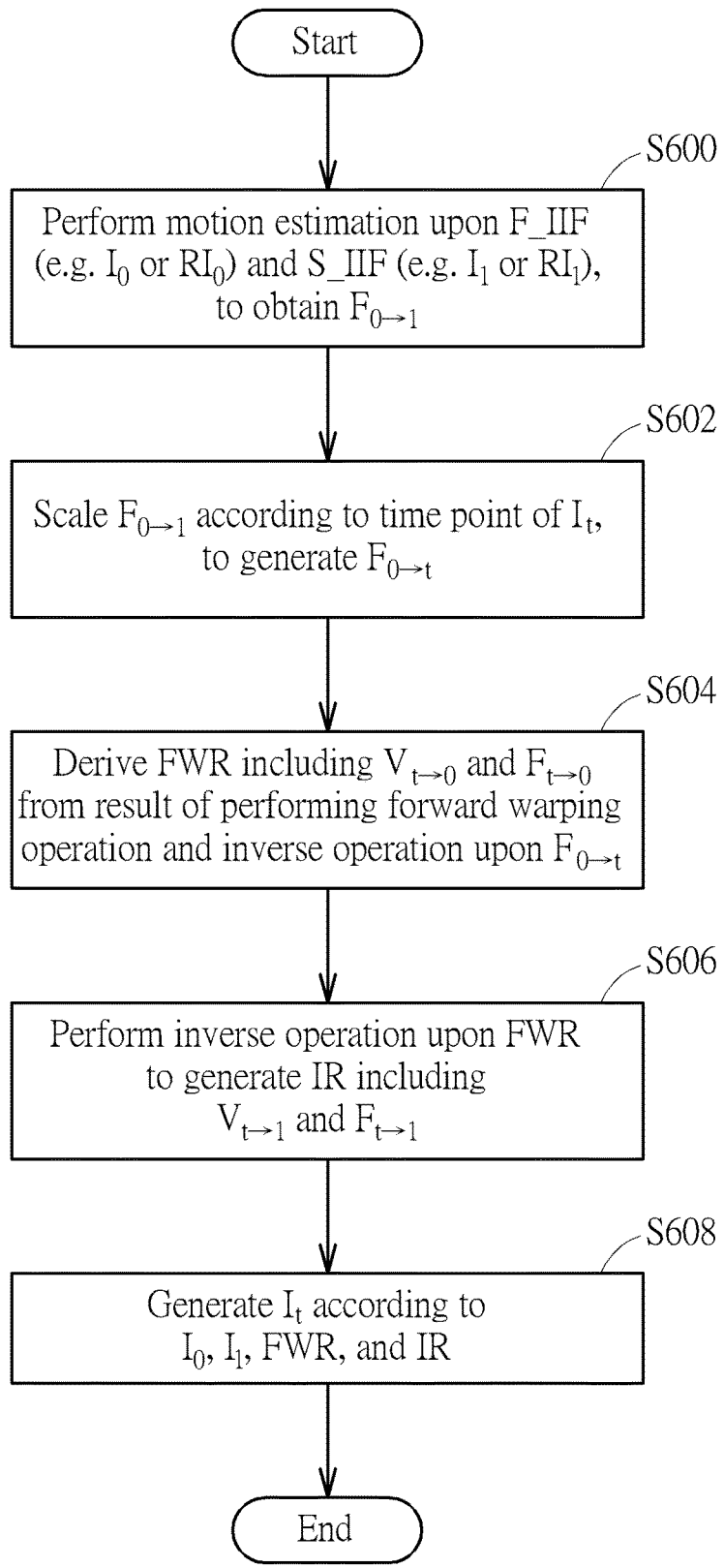
FIG. 6 is a flow chart of a frame interpolation method according to an embodiment of the present invention.

FIG. 6 is a flow chart of a frame interpolation method according to an embodiment of the present invention. Provided that the result is substantially the same, the steps are not required to be executed in the exact order shown in FIG. 6. For example, the method shown in FIG. 6 may be employed by the frame interpolation module 20 shown in FIG. 2 or FIG. 4. For better comprehension, in this embodiment, the control scheme of the frame interpolation module 20 shown in FIG. 2 is taken as an example.

In Step S600, the motion estimation is performed upon the first input image frame F_IIF (e.g. the image frame $I_0$ or the resized image frame $RI_0$) and the second input image frame S_IIF (e.g. the image frame $I_1$ or the resized image frame $RI_1$), to obtain the single-directional motion $F_{0 \to 1}$.

In Step S602, the single-directional motion $F_{0 \to 1}$ is scaled according to the time point of the target image frame $I_t$, to generate the scaled motion $F_{0 \to t}$.

In Step S604, the forward-warped result FWR including the refined alpha map $V_{t \to 0}$ and the refined motion $F_{t \to 0}$ is derived from a result of performing a forward warping operation and an inverse operation upon the scaled motion $F_{0 \to t}$.

In Step S606, an inverse operation is performed upon the forward-warped result FWR to generate the inversed result IR including the inversed alpha map $V_{t \to 1}$ and the inversed motion $F_{t \to 1}$.

In Step S608, the target image frame $I_t$ is generated according to the image frame $I_0$, the image frame $I_1$, the forward-warped result FWR, and the inversed result IR.

Since a person skilled in the pertinent art can readily understand details of the steps after reading above paragraphs directed to the frame interpolation module 20 shown in FIG. 2, further description is omitted here for brevity.

In summary, by the frame interpolation method of the present invention, under a condition that only a single-directional motion can be obtained due to some reasons (e.g. tradeoff between cost, computation, and/or power saving), frame interpolation can be performed successfully.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A frame interpolation method for generating a third image frame interpolated between a first image frame and a second image frame, comprising:
   performing motion estimation upon a first input image frame and a second input image frame, to obtain a single-directional motion, wherein the first input image frame is derived from the first image frame, and the second input image frame is derived from the second image frame;
   scaling the single-directional motion according to a time point of the third image frame, to generate a scaled motion;
   deriving a forward-warped result from a result of performing a forward warping operation and a first inverse operation upon the scaled motion;
   performing a second inverse operation upon the forward-warped result, to generate an inversed result; and
   generating the third image frame according to the first image frame, the second image frame, the forward-warped result, and the inversed result.

2. The frame interpolation method of claim 1, further comprising:
   resizing the first image frame and the second image frame, respectively, to generate a first resized image frame as the first input image frame and a second resized image frame as the second input image frame.

3. The frame interpolation method of claim 1, wherein the step of deriving the forward-warped result from the result of performing the forward warping operation and the first inverse operation upon the scaled motion comprises:
   performing the forward warping operation and the first inverse operation upon the scaled motion, to generate a coarse forward-warped result; and
   refining the coarse forward-warped result according to at least the first input frame and the second input frame, to generate the forward-warped result.

4. The frame interpolation method of claim 3, further comprising:
   performing a backward warping operation upon the first input image frame according to the coarse forward-warped result, to generate a backward-warped result;
   wherein the step of refining the coarse forward-warped result according to at least the first input image frame and the second input image frame, to generate the forward-warped result comprises:
refining the coarse forward-warped result according to the first input image frame, the second input image frame, and the backward-warped result, to generate the forward-warped result.

5. The frame interpolation method of claim 3, wherein the coarse forward-warped result comprises an alpha map and a forward-warped motion, and the step of refining the coarse forward-warped result according to at least the first input image frame and the second input image frame, to generate the forward-warped result comprises:
refining the alpha map according to at least the first input image frame and the second input image frame, to generate a refined alpha map; and
refining the forward-warped motion according to at least the first input image frame and the second input image frame, to generate a refined motion;
wherein the forward-warped result comprises the refined alpha map and the refined motion.

6. The frame interpolation method of claim 5, wherein the step of performing the second inverse operation upon the forward-warped result, to generate the inversed result comprises:
performing the second inverse operation upon the refined alpha map, to generate an inversed alpha map; and
performing the second inverse operation upon the refined motion, to generate an inversed motion;
wherein the inversed result comprises the inversed alpha map and the inversed motion.

7. The frame interpolation method of claim 3, wherein the step of refining the coarse forward-warped result according to at least the first input image frame and the second input image frame, to generate the forward-warped result further comprises:
inpainting holes caused by performing the forward warping operation.

8. The frame interpolation method of claim 1, wherein the step of generating the third image frame according to the first image frame, the second image frame, the forward-warped result, and the inversed result comprises:
performing a backward warping operation upon the first image frame and the second frame according to the forward-warped result and the inversed result, respectively, to generate a first backward-warped result and a second backward-warped result; and
blending the first backward-warped result and the second backward-warped result according to the forward-warped result and the inversed result, to generate the third image frame.

9. The frame interpolation method of claim 8, wherein the forward-warped result comprises a motion, the inversed result comprises an inversed motion, and the step of performing the backward warping operation upon the first image frame and the second image frame according to the forward-warped result and the inversed result, respectively, to generate the first backward-warped result and the second backward-warped result comprises:
performing the backward warping operation upon the first image frame according to the motion, to generate the first backward-warped result; and
performing the backward warping operation upon the second image frame according to the inversed motion, to generate the second backward-warped result.

10. The frame interpolation method of claim 8, wherein the forward-warped result comprises an alpha map, the inversed result comprises an inversed alpha map, and the step of blending the first backward-warped result and the second backward-warped result according to the forward-warped result and the inversed result, to generate the third image frame comprises:
multiplying the first backward-warped result and the alpha map, to generate a first multiplication result;
multiplying the second backward-warped result and the inversed alpha map, to generate a second multiplication result; and
adding the first multiplication result and the second multiplication result to generate the third image frame.

11. A non-transitory machine-readable medium for storing a program code, wherein when loaded and executed by a processor, the program code instructs the processor to execute:
a frame interpolation module, arranged to generate a third image frame interpolated between a first image frame and a second image frame, and comprising:
a motion estimating module, arranged to perform motion estimation upon a first input image frame and a second input image frame, to obtain a single-directional motion, wherein the first input image frame is derived from the first image frame, and the second input image frame is derived from the second image frame;
a scaling module, arranged to scale the single-directional motion according to a time point of the third image frame, to generate a scaled motion;
a first processing module, arranged to derive a forward-warped result from a result of performing a forward warping operation and a first inverse operation upon the scaled motion;
an inverse module, arranged to perform a second inverse operation upon the forward-warped result, to generate an inversed result; and
a second processing module, arranged to generate the third image frame according to the first image frame, the second image frame, the forward-warped result, and the inversed result.

12. The non-transitory machine-readable medium of claim 11, wherein the frame interpolation module further comprises:
a resizing module, arranged to resize the first image frame and the second image frame, respectively, to generate a first resized image frame as the first input image frame and a second resized image frame as the second input image frame.

13. The non-transitory machine-readable medium of claim 11, wherein the first processing module comprises:
a forward warping module, arranged to perform the forward warping operation and the first inverse operation upon the scaled motion, to generate a coarse forward-warped result; and
a refining module, arranged to refine the coarse forward-warped result according to at least the first input frame and the second input frame, to generate the forward-warped result.

14. The non-transitory machine-readable medium of claim 13, wherein the frame interpolation module further comprises:
a backward warping module, arranged to perform a backward warping operation upon the first input image frame according to the coarse forward-warped result, to generate a backward-warped result;
wherein the refining module is further arranged to refine the coarse forward-warped result according to the first input image frame, the second input image frame, and the backward-warped result, to generate the forward-warped result.

15. The non-transitory machine-readable medium of claim 13, wherein the coarse forward-warped result comprises an alpha map and a forward-warped motion, and the refining module is further arranged to:
  refine the alpha map according to at least the first input image frame and the second input image frame, to generate a refined alpha map; and
  refine the forward-warped motion according to at least the first input image frame and the second input image frame, to generate a refined motion;
  wherein the forward-warped result comprises the refined alpha map and the refined motion.

16. The non-transitory machine-readable medium of claim 15, wherein the refining module is further arranged to:
  perform the second inverse operation upon the refined alpha map, to generate an inversed alpha map; and
  perform the second inverse operation upon the refined motion, to generate an inversed motion;
  wherein the inversed result comprises the inversed alpha map and the inversed motion.

17. The non-transitory machine-readable medium of claim 13, wherein the inverse module is further arranged to inpaint holes caused by performing the forward warping operation.

18. The non-transitory machine-readable medium of claim 11, wherein the second processing module comprises:
  multiple backward warping modules, arranged to perform a backward warping operation upon the first image frame and the second frame according to the forward-warped result and the inversed result, respectively, to generate a first backward-warped result and a second backward-warped result; and
  a blending module, arranged to blend the first backward-warped result and the second backward-warped result according to the forward-warped result and the inversed result, to generate the third image frame.

19. The non-transitory machine-readable medium of claim 18, wherein the forward-warped result comprises a motion, the inversed result comprises an inversed motion, and the multiple backward warping modules comprises:
  a first backward warping module, arranged to perform the backward warping operation upon the first image frame according to the motion, to generate the first backward-warped result; and
  a second backward warping module, arranged to perform the backward warping operation upon the second image frame according to the inversed motion, to generate the second backward-warped result.

20. The non-transitory machine-readable medium of claim 18, wherein the forward-warped result comprises an alpha map, the inversed result comprises an inversed alpha map, and the blending module is further arranged to:
  multiply the first backward-warped result and the alpha map, to generate a first multiplication result;
  multiply the second backward-warped result and the inversed alpha map, to generate a second multiplication result; and
  add the first multiplication result and the second multiplication result to generate the third image frame.

* * * * *